(12) United States Patent
Rajasekhar et al.

(10) Patent No.: US 8,549,338 B2
(45) Date of Patent: Oct. 1, 2013

(54) LOW-POWER DATA LOOP RECORDER

(75) Inventors: Suribhotla V. Rajasekhar, Plano, TX (US); Robert J. Landers, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 505 days.

(21) Appl. No.: 12/819,550

(22) Filed: Jun. 21, 2010

(65) Prior Publication Data

US 2011/0314310 A1    Dec. 22, 2011

(51) Int. Cl.
*G06F 1/32* (2006.01)
(52) U.S. Cl.
USPC ............... 713/320; 713/300; 713/324
(58) Field of Classification Search
USPC ............... 713/300, 320, 322, 323, 324
See application file for complete search history.

(56) References Cited

U.S. PATENT DOCUMENTS

| | | | | |
|---|---|---|---|---|
| 5,687,279 A | * | 11/1997 | Matthews | 704/201 |
| 5,687,382 A | * | 11/1997 | Kojima et al. | 713/320 |
| 5,832,286 A | * | 11/1998 | Yoshida | 713/324 |
| 5,903,868 A | * | 5/1999 | Yuen et al. | 704/270 |
| 7,100,013 B1 | * | 8/2006 | de Waal | 711/170 |
| 2007/0280026 A1 | * | 12/2007 | Hunter et al. | 365/227 |

* cited by examiner

*Primary Examiner* — Paul Yanchus, III
(74) *Attorney, Agent, or Firm* — Alan A. R. Cooper; W. James Brady, III; Frederick J. Telecky, Jr.

(57) ABSTRACT

A system and method are disclosed for capturing pre- and post-event data for random events using minimum power. Real-time data is captured and stored in a continuous loop in a segment of a first memory. Upon detection of a designated event, a second memory is powered-on and post-event data is stored to a segment of the second memory. After a designated data capture window, the second memory is powered-off and real-time data is captured in an unused segment of the first memory. The post-event data may be captured in the unused segment of the first memory and later transferred to the second memory. Auto-address logic monitors and controls the storage and retrieval of pre- and post-event in the first and second memory. An energy management system determines and controls which segments of the first and second memory should be powered-on or kept in the stasis mode to store event data.

18 Claims, 3 Drawing Sheets

LOW-POWER DATA LOOP RECORDER

TECHNICAL FIELD

Embodiments of the invention are directed, in general, to data loop recorder memories and, more specifically, to reducing power consumption in data loop recorders that capture both pre-event and post-event data.

BACKGROUND

Power consumption and battery life are major concerns in remote or inaccessible data loop recorders, such as deployed field equipment or medical sensors. Data loop recorders typically sample data when triggered by a specific event. The data is stored for later reading, downloading or transmission. Often, it is desirable to capture data that precedes the triggering event (i.e. pre-event data) as well as post-event data. Because the exact time that a triggering event will occur is unknown, the data loop recorder memory must be powered-on at all times in order to capture pre-event data. This requires higher power consumption than desired in devices that are already power limited by battery capacity. As a result, the available memory, functionality, and longevity in battery-powered data loop recorders are limited.

SUMMARY

Embodiments of the invention partition the loop recorder memory in a unique manner and dynamically control the memory power to lower power consumption. Embodiments of the invention include the use of four major functional blocks: Inner Loop Memory, Outer Loop Event Memory, Energy Management System, and Auto-Address Logic as described below.

Inner Loop Memory (ILM) is a segmented memory that operates in an always-on power state. ILM captures pre-event data in a continuous loop. In one embodiment, a new ILM memory segment is used for each new event. Outer Loop Event Memory (OLM) is maintained in an ultra-low-power retention mode or stasis mode until an event is detected. Upon receiving an event trigger, post-event data is stored into the OLM in one embodiment. After the post-event data is captured, the OLM reverts back into the stasis mode. In alternative embodiments, the OLM memory may be segmented and the power for each segment may be dynamically controlled by the Energy Management System (EMS). The EMS determines and controls which segments of the OLM should be powered-on or kept in the stasis mode. An Auto-Address Logic (AAL) block maintains address mapping between the ILM and OLM. The AAL also manages event trigger generation by processing raw data (e.g. pre-event data) to identify significant events that should be recorded. The AAL seamlessly provides pre and post-event data from the ILM and OLM to external devices without requiring additional address manipulation, thereby making the loop recorder device backward compatible with existing applications.

The ILM and OLM may use standard as well custom memories, such as SRAM, Flash, and FRAM. Embodiments of the invention allow for the largest part of the memory—the OLM—to be kept in an ultra-low-power, stasis mode. The data loop recorder disclosed herein provides power advantages that increase device longevity and allows for the use of more memory (and, therefore, the collection of more data) without increasing the required power level. Embodiments of the invention can be applied to any recording application where power saving is critical.

According to one embodiment, a recording device comprises a first memory partitioned into a plurality of first segments, and a second memory partitioned into a plurality of second segments. An address logic circuit is coupled to both the first memory and the second memory. The address logic circuit controls read and write locations for data stored to the first memory and the second memory. An energy management system is coupled to the second memory. The energy management system controls a power state of the second memory. The energy management system may also be coupled to the first memory to control a power state of the first memory segments. A data bus is coupled to the first memory and the second memory. Real-time data received on the data bus is stored to a selected first memory segment, wherein the selected segment acts as a circular buffer.

A processor is coupled to the address logic circuit, the energy management system, and the data bus. The processor monitors data received on the data bus and identifies designated events. The processor sends an event trigger to the address logic circuit and to the energy management system upon detection of a designated event. The address logic circuit may include a pointer table identifying locations of stored data for a plurality of events. The energy management system supplies power to the second memory upon detection of an event trigger, and the address logic circuit causes data to be stored to the second memory.

In another embodiment, a method for storing data comprises storing first pre-event data to a first segment of a first memory. The first segment operates as a circular buffer to store a selected duration of recent data. A first event trigger is received, and first post-event data is stored beginning at a second segment of the first memory during a first data-capture period. The first post-event data comprising data received after the first event trigger. The second memory is powered-on, and the first pre-event data and first post-event data are transferred to a first segment of the second memory. The second memory may be powered-on at the end of the first data-capture period. The first pre-event data and first post-event data may be transferred to the first segment of the second memory at the end of the first data-capture period. When the second memory is powered-on, either all of segments of the second memory or only selected segments of the second memory are powered-on. A pointer is stored to identify the location in the first memory corresponding to receipt of the first event trigger.

A second event trigger may be received during the first data-capture period. Second post-event data is stored to the first memory during a second data-capture period. The second data-capture period may overlap the first data-capture period. The second pre-event data may overlap the data stored for the first event. The second pre-event data and second post-event data are transferred to a second segment of the second memory. A pointer is stored to identify to a location in the first memory corresponding to receipt of the second event trigger.

In a further embodiment, a method for storing data comprises storing pre-event data to a first segment of a first memory. The first segment operates as a circular buffer to store a selected duration of data. Upon receipt of an event trigger, a second memory is powered-on. Post-event data received after the event trigger is stored to a first segment of the second memory during a data-capture period. At the end of the data-capture period, the second memory is powered-off. The pre-event data is transferred to the first segment of the second memory. The pre-event data and post-event data are combined in chronological order in the first segment of the second memory. A pointer is stored to identify a location in the first memory corresponding to receipt of the event trigger.

Second pre-event data is stored to a second segment of the first memory. The second segment operates as a circular buffer to store the selected duration of data. Upon receiving a second event trigger, the second memory is powered-on and second post-event data is stored to a second segment of the second memory during a second data-capture period. At the end of the second data-capture period, the second memory is powered-off. A pointer to a location in the first memory corresponding to receipt of the second event trigger.

Alternative embodiments are directed to a recording device comprising a first memory partitioned into a plurality of first segments. The sizes of the first segments are selected to provide storage for a predetermined pre-event time period. The first memory is optimized relative to a second memory to require low access power. The second memory is partitioned into a plurality of second segments. The sizes of the second segments are selected to provide storage for a predetermined event period. The event period comprises both the pre-event period and a post-event period. The second memory is optimized relative to the first memory to require low static power. An address logic circuit is coupled to the first memory and to the second memory. The address logic circuit controls read and write locations for data stored to the first and second memory. An energy management system is coupled to the second memory. The energy management system controls a power state of the second memory. The energy management system may also be coupled to the first memory to control the power state of segments of the first memory.

BRIEF DESCRIPTION OF THE DRAWINGS

Figure 1:
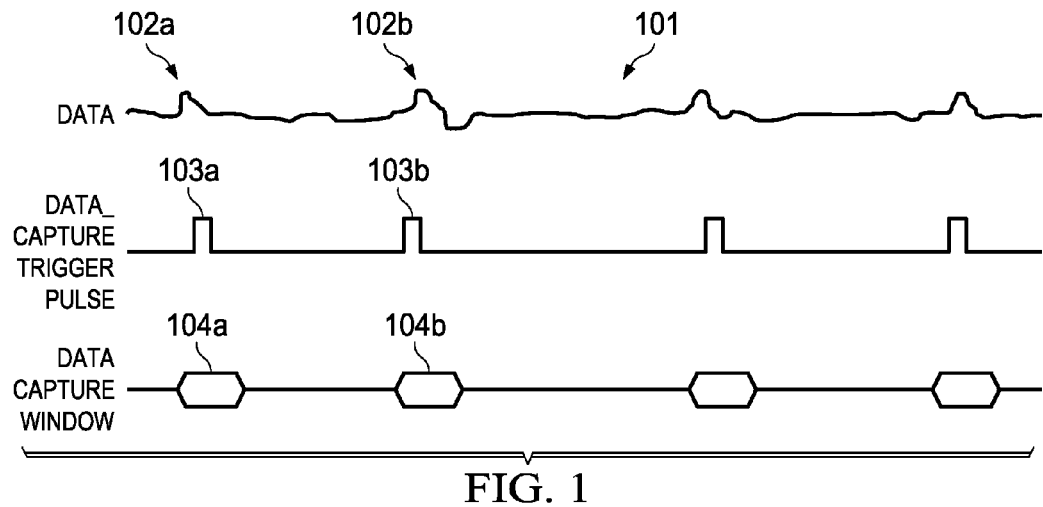
Figure 6:
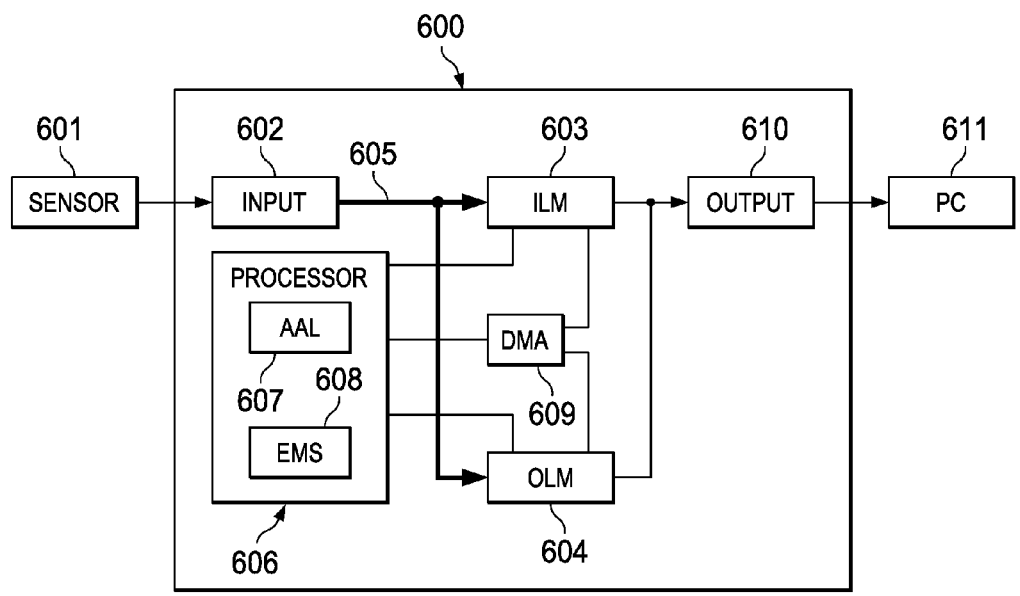
Figure 2:
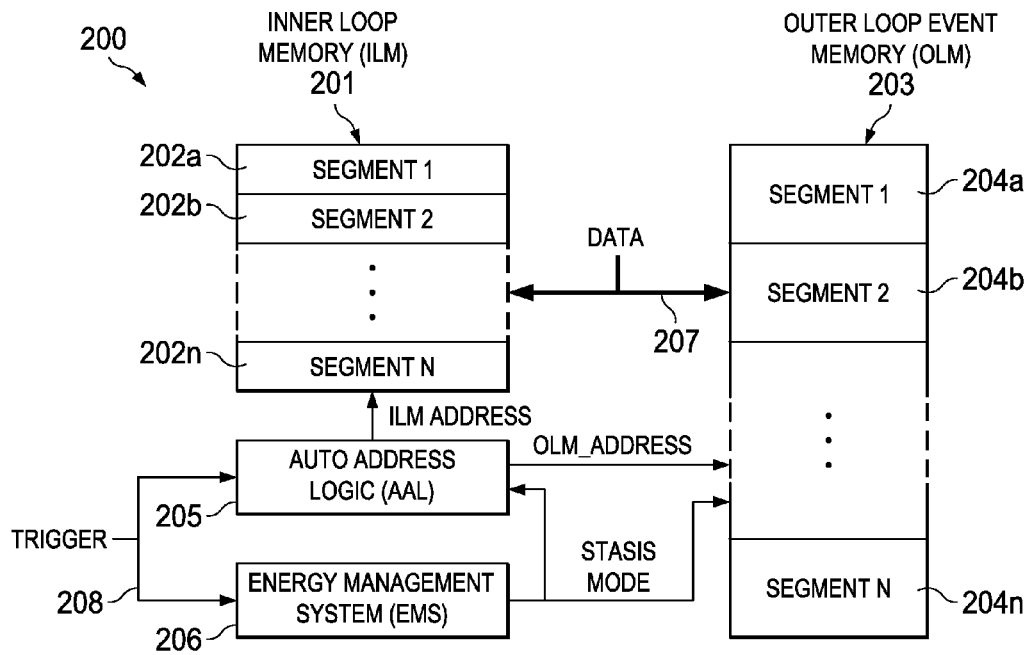
Figure 3:
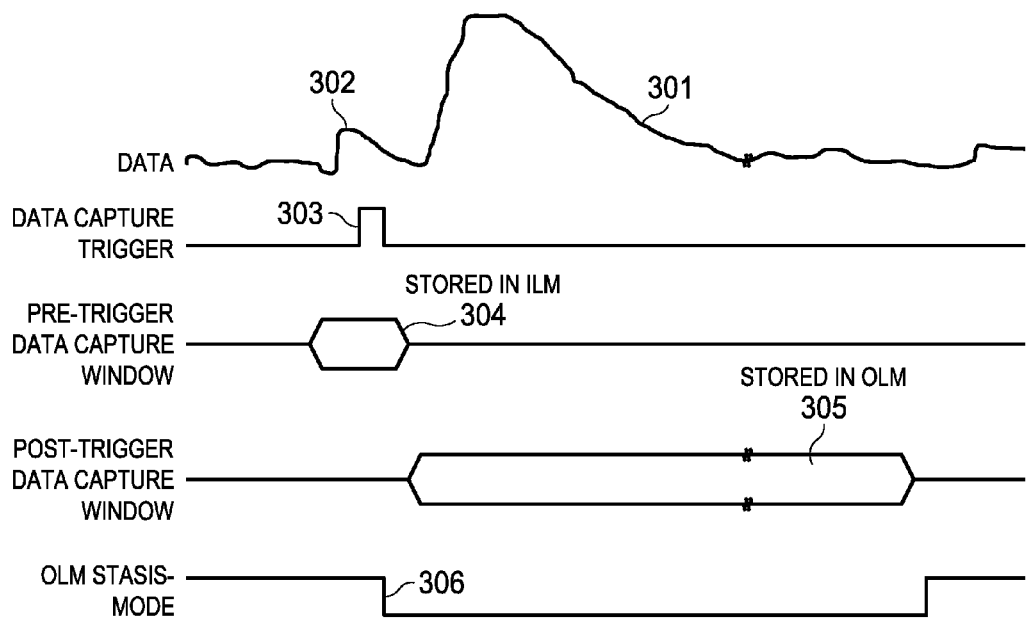
Figure 4:
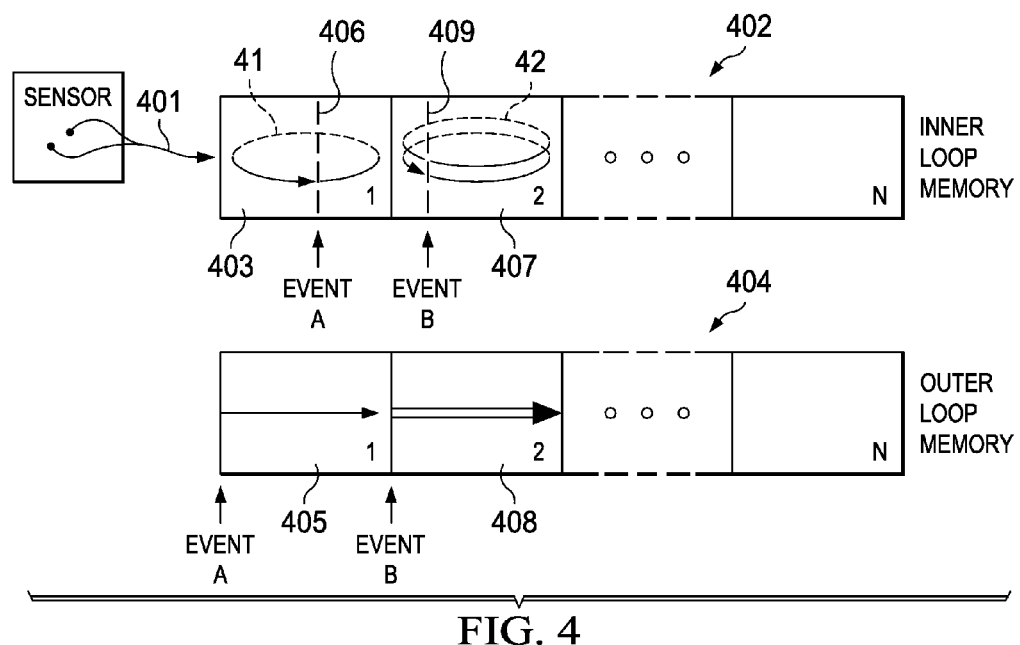
Figure 5:
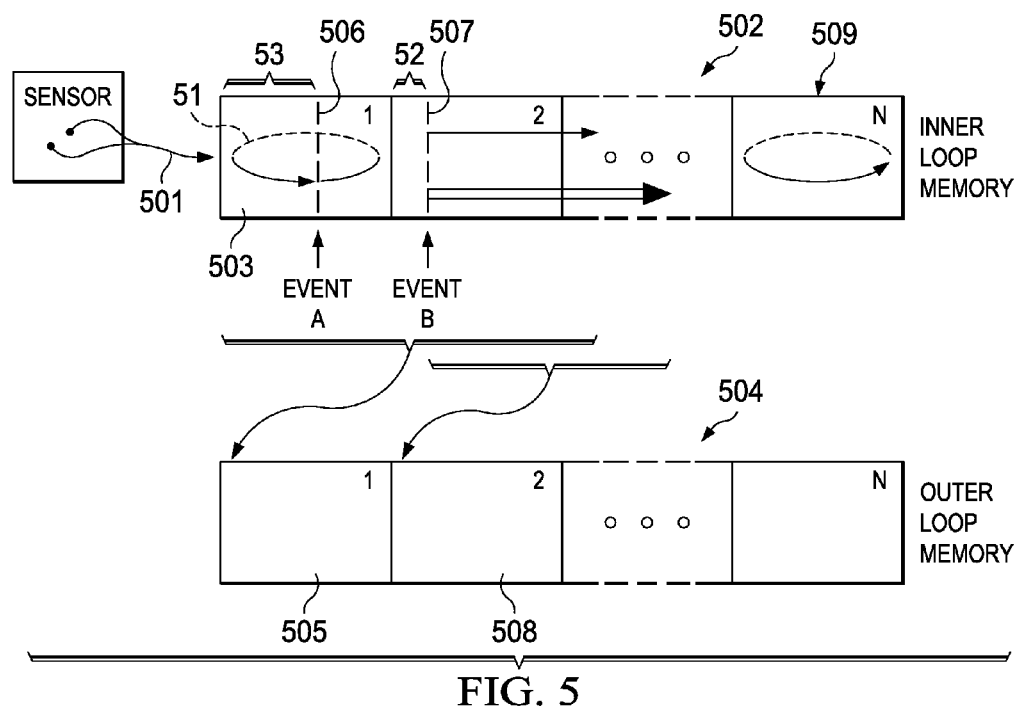

Having thus described the invention in general terms, reference will now be made to the accompanying drawings, wherein:

FIG. 1 illustrates a typical loop recorder data-capture sequence over multiple trigger events;

FIG. 2 is a block diagram of a data loop recorder according to one embodiment of the invention;

FIG. 3 illustrates a loop recorder data-capture sequence according to one embodiment of the invention;

FIG. 4 is a block diagram illustrating the capture and storage of data for multiple events according to one embodiment;

FIG. 5 is a block diagram illustrating the capture and storage of data for multiple events according to another embodiment; and FIG. 6 is a block diagram of a monitoring device comprising one embodiment of the data loop recorder disclosed herein.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a typical loop recorder data-capture sequence over multiple trigger events. Sensors monitor data 101 and detect events of interest 102. Upon detection of an event 102, a corresponding event trigger, such as a data-capture trigger pulse 103, is generated to prompt the data loop recorder to capture the incoming data 101 during a capture window 104. The data recorded in the memory is later transferred, downloaded or read by an operator for analysis. Data 101 may be from any source and may comprise any information, such as physiological, environmental, meteorological, or seismic data, without limitation. It is not possible to predict when events 102 will occur or when data-capture trigger pulse 103 will be send to the data loop recorder. Trigger pulses 103 may occur sporadically at intervals that are longer than the desired data-capture window 104. For example, individual events 102 and triggers pulses 103 may occur every few seconds or longer, but the data of interest may last only a few microseconds or milliseconds. Thus, the data-capture duty-cycle may be small in some embodiments.

Data that arrives before a specific event 102 or trigger pulse 103 (i.e. pre-event data) may be of interest and should be captured by the data loop recorder. However, because the occurrence of the events 102 is not known ahead of time, the data loop recorder must always be powered-on to capture pre-event data. Given the low data-capture duty-cycle, the power consumption required to capture pre-event data in known data loop recorders is excessive.

If the monitoring device and data loop recorder memory have unlimited access to power, then the memory can record in a continuous loop. In such a case, data-capture window can be configured to capture pre-event data that occurs before trigger pulse 103, but that has already been captured by the continuous loop memory. However, if the data loop recorder memory runs off of a limited power supply, such as a battery, then such continuous recording would rapidly drain the power supply. It may not be feasible to recharge the power supply or replace batteries if the data loop recorder is deployed in an inaccessible device, such as a down-hole drilling sensor, remote terrestrial seismic monitor, physiological sensor, or space-based meteorological or environmental monitor. Embodiments of the present invention provide for reduced power consumption in data loop recorders thereby allowing them to capture data over a longer period on limited power.

FIG. 2 is a block diagram of a data loop recorder 200 according to one embodiment of the invention. Inner Loop Memory (ILM) 201 is divided into a plurality of segments 202. Outer Loop Memory (OLM) 203 is divided into a plurality of segments 204. Auto Address Logic (AAL) 205 controls data storage and addressing in ILM 201 and OLM 203. Energy Management System (EMS) 206 controls the power for OLM 203 and memory segments 204. Incoming data is received over data bus 207 and written to ILM 201 and OLM 203 at segments and addresses designated by AAL 205 upon detection of an event trigger 208.

ILM 201 records all incoming data into an active segment. For example, before a first event is detected, ILM segment 1 (202a) acts as a circular buffer and stores all incoming data. AAL 205 controls how incoming data is written into ILM segment 1 (202a). When ILM segment 1 (202a) is full, AAL 205 overwrites older data in the same segment by moving to the top of the segment and storing the additional incoming data. AAL 205 continues to overwrite the data in ILM segment 1 (202a), looping back to the top of the segment every time the segment fills up. The data stored in ILM 201 is the pre-event data. The size of segments 202 is selected based upon the desired amount of pre-event data. In one embodiment, for example, segments 202 are sized to record 1 second of pre-event data. Accordingly, after every second, new incoming data 207 overwrites the existing data in an ILM segment 202.

In one embodiment, ILM 201 is always powered-on. In other embodiments, portions of ILM 201 can be powered-off depending upon the system's low-power requirements. For example, EMS 206 may control the power to segments of ILM 201. EMS 206 may power-off segments of ILM 201 that are not required to capture a pre-event data for a current event. The unneeded segments of ILM 201 are placed in stasis mode, while other segments of ILM 201 are powered-on to capture pre-event data.

When an event is detected and an event trigger 208 is received, EMS 206 powers-on OLM 203 and AAL 205 begins storing post-event data to the corresponding segment 1 (204a) of OLM 203. In one embodiment, each event is recorded in a separate pair of segments 202/204. The number of segments 202 and 204 is selected based upon the maximum number of events to be recorded. The size of segments 204 is selected based upon the desired amount of post-event data to be recorded. In one embodiment, for example, segments 204 are sized to record 15 seconds of post-event data. It will be understood that the size of segments 202/204 and the amount of data to be recorded in each segment depends upon the corresponding monitoring application and the type of data to be recorded. The range of data to be stored in typical applications may range from milliseconds to minutes, but may be a longer or shorter time.

In one embodiment, the pre-event data for a first event remains in ILM segment 1 (202a) and post-event data for the first event is stored in OLM segment 1 (204a). When the event data is read out, AAL 205 controls the memory access and seamlessly reads the data out of the appropriate segments so that data loop recorder 200 appears as a single memory device. AAL 205 maintains pointers to the starting point of the pre-event data in each segment 202—i.e. a pointer to the oldest data in the segment. Because data is stored to ILM segments 202 in a circular manner, the starting point for the data is continually changing and could occur at any point in the segment, not just at the beginning of the segment.

In another embodiment, pre-event data from ILM segment 202 is moved to the corresponding OLM segment 204 so that all of the data for each event is stored in OLM 203 and can be read out directly from OLM 203 by AAL 205. Space can be reserved at the beginning of each OLM segment 204 for the pre-event data. The pre-event data may be moved to the OLM segment 204 upon receipt of an event trigger, or during or after the recording of the post-event data.

In an alternative embodiment, post-event data may be written directly to ILM 201. After capturing the data during the designated post-event period, the data may be transferred from ILM 201 to OLM 203 for storage.

At least some segments of ILM 201 is always powered-on to capture pre-event data, while other segments of ILM 201 and OLM 203 are selectively powered-on to capture post-event data. EMS 206 provides dynamic power management for ILM 201 and OLM 203. EMS 206 may power-on the entire OLM to record post-event data or may power-on selected segments only. After event data has been stored, EMS 206 puts OLM 203 in a stasis mode that provides only enough power required to maintain the stored data. It will be understood by those of ordinary skill in the art that EMS 206 may control the power consumed by OLM 203 in a number of different ways. For example, EMS 206 may use power gating to control the power supplied to individual segments of OLM 203 or to OLM 203 as a whole. Alternatively, EMS 206 may use clock gating to limit the usage of OLM 203 and, therefore, limit the power consumed by OLM 203. By controlling the number of transactions sent to OLM 203, EMS 206 can limit the power consumed by the memory.

The specific types of memory selected for ILM 201 and OLM 203 should be optimized for their respective uses. ILM 201 and OLM 203 do not have to be of the same type, but can be independently selected based upon leakage current and dynamic power requirements. ILM 201, which is running all the time, is preferably optimized for low dynamic power or low access current. ILM 201 may be a ping-pong or dual buffering memory. For example, ILM 201 may be a small, low-power SRAM with an access power of approximately 50 pJ and a standby current of approximately 100 nA. OLM 203, which is usually in a standby or stasis mode, is preferably optimized for low leakage current. For example, OLM 203 may be FRAM or Flash memory with an access power of approximately 200 pJ and a standby current of approximately 50 nA. OLM 203 may comprise non-volatile memory in which selected memory blocks are powered up by EMS 206 only during write time and then powered-off after event data is captured.

FIG. 3 illustrates a loop recorder data-capture sequence according to one embodiment of the invention. Data 301 is monitored and continuously recorded into a segment of an ILM, where data is overwritten by new data until an event is detected. The amount of current data stored in the ILM corresponds to the size of pre-trigger data-capture window 304. When an event of interest 302 is detected, the monitoring device sends data-capture trigger pulse 303 to the data loop memory. Trigger pulse 303 causes OLM stasis-mode signal to shift from high (stasis-mode on) to low (stasis-mode off), which in turn activates the OLM. Data is then stored to the OLM for the duration of post-trigger data-capture window 305.

FIG. 4 is a block diagram illustrating the capture and storage of data for multiple events according to one embodiment of the invention. Data 401, such as environmental or seismic information detected by a remote sensor, is captured by ILM 402, which loops (41) within first ILM segment 403 storing data in real-time. When Event A is detected, OLM 404 is powered-on and post-event data 401 is routed to first OLM segment 405. OLM 404 typically requires some finite power-up time from detection of an event until OLM 404 is fully powered-on and ready to record event data. During this power-up time, ILM 402 captures the post-event data until OLM 404 is fully powered-on and begins to capture post-event data. During post-event data capture or at the end of the designated data-capture window, the data from ILM segment 403 may be transferred to OLM 404 for storage. This allows all of the Event A data to be stored in OLM segment 405 to maximize energy savings. After the data has been stored to OLM segment 405, the OLM 404 is powered-off. In an alternative embodiment, the data associated with Event A may be divided between ILM segment 403 and OLM segment 405.

An AAL (not shown) keeps track of the events and maintains pointers to memory locations in ILM where the events begin. As incoming data is received, the AAL uses a pointer to track the current location of the data looping within an ILM segment. Upon detection of an event, the AAL stores the current location 406 of the pointer. This location corresponds to the start of the pre-event data within the segment. The AAL also stores a pointer to the corresponding OLM segment 405 that captures the post-event data. When the pre-Event A data has been transferred from ILM 403 to OLM segment 405, the AAL updates the pointers for the pre- and post-Event A data to point to locations in segment 405.

After capturing the Event A data, new incoming data 401 is stored to second ILM segment 407. Again, data is overwritten (42) within segment 407 until Event B is detected. At that time, OLM 404 is again powered-on and data 401 is routed to second OLM segment 408, which captures post-event data for Event B. During post-event data capture, or at the end of the designated data-capture window, the Event B data is transferred from ILM segment 407 to OLM segment 408 so that all of the Event B data will be stored in one location. The OLM 404 is then powered-off. In an alternative embodiment, the Event B may be divided between ILM segment 407 and OLM segment 408. The AAL stores the location of pointer 409, which corresponds to the start of the pre-event data for Event B. The AAL also stores a pointer to OLM segment 408, which holds the post-event data for Event B. When the pre-event data is moved from ILM segment 407 to OLM segment 408, the pointers are updated to reflect the stored locations of the Event B data.

The capture of data as illustrated in FIG. 4 is useful for situations in which events occur at relatively widely spaced intervals that are longer than the designated data-capture window. If Event B instead occurred during the data-capture window for Event A in FIG. 4, then the pre-event data (and some of the post-event data) for Event B would overlap the data for Event A and would be stored in segment 405. In such a case, the AAL would have to maintain a pointer to segment 405 to identify the start of the Event B data.

FIG. 5 is a block diagram illustrating the capture and storage of data for multiple events according to another embodiment of the invention. Incoming data 501 is captured by ILM 502, which loops (51) within first ILM segment 503 storing data in real-time. When Event A is detected, the incoming post-event data 501 is stored to second ILM segment 504 without looping or overwriting. The AAL maintains a pointer to location 506 within segment 503 to mark the start of the pre-event data. At the end of the designated data-capture window, OLM 504 is powered-on and the data for Event A is transferred from ILM 502 to first OLM segment 505. Using the pointer 506, the data for Event A can be transferred to OLM 504 and stored in chronological order. When the data has been stored to segment 505, the OLM 504 is powered-off and placed in stasis-mode.

FIG. 5 also illustrates a second event, Event B that occurs within the data-capture window for Event A. As a result of the proximity of Events A and B, the data for their respective data-capture windows overlaps. The AAL maintains a pointer 507 to identify the beginning of the Event B data. In this case, at the end of the Event A data-capture window, ILM 502 continues to record incoming data 501 for the duration of the Event B data-capture window. After capturing the Event B data, OLM 504 can be powered-on and the Event B data transferred to second OLM segment 508. The pre-event data for Event B overlaps with the Event A data and includes, for example, post-Event A data portion 52 and pre-Event A data portion 53. The AAL identifies the pre-Event B data by moving back the appropriate duration from the Event B pointer 507.

In one embodiment, the transfer of the Event A data to OLM 505 may be delayed until the Event B data has been captured. Alternatively, depending upon the DMA and memory speed and the rate of incoming data 501, the Event A data may transferred during the Event B data-capture window.

If additional events occur during the data-capture window for Event A or B, then ILM 502 continues to store incoming data 501 for subsequent data-capture window periods until data for each event has been captured and transferred to OLM 504. After the data for Event B (or the last event) has been captured by ILM 502, additional data is stored in the next available ILM segment 509 while the earlier event data is transferred to OLM 504.

FIG. 6 is a block diagram of a monitoring device 600 comprising one embodiment of the data loop recorder disclosed herein. Monitor 600 is coupled to a sensor 601 via input interface 602. Sensor 601 may be integral to or physically separate from monitor 600. An incoming data stream is received from sensor 601 at input 602 and passed to ILM 603 and OLM 604 over data bus 605. DMA 609 controls the transfer of data between ILM 603 and OLM 604. Processor 606 controls the operation of monitor 600 and the data loop recorder. In the embodiment illustrated in FIG. 6, AAL 607 and EMS 608 are state machines running on processor 606. In other embodiments, the AAL and/or EMS may be embodied as a software or firmware running on processor 606 or a separate device, such as a specialized chip or Application Specific Integrated Circuit (ASIC). Processor 600 monitors incoming data from sensor 601 and identifies designated events. Upon detection of a designated event, processor 600 sends an event trigger to AAL 607 and EMS 608 to prompt recording of pre-event and post-event data in ILM 603 and OLM 604.

AAL 607 maintains pointers to memory locations in ILM and OLM corresponding to where captured data begins for each event. The pointers allow the AAL to make sense of the recorded data and to manage the correct reading out of the data. AAL 607 may maintain a table of pointers or registers that identify the location of each event. The table may comprise, for example, an event identifier, a timestamp, a pointer to the event data in the ILM, pointer to the event data in the OLM, and a description of the event that caused the data capture. AAL 607 controls the transfer of data into and out of ILM 603 and OLM 604. Data may be downloaded from monitor 600 via output interface 610 for real-time or offline processing as required by the monitored events and monitoring application. Data may be downloaded or output to a personal computer 611, for example. Data may be transferred out of monitor 600 in any known manner, such as by direct connection, wireline transfer or wireless transmission.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A recording device that can detect a first event and a second event, wherein the second event occurs within a data capture window of the first event, comprising:
   a first memory partitioned into a plurality of first segments;
   a second memory partitioned into a plurality of second segments;
   an address logic circuit coupled to the first memory and to the second memory, the address logic circuit controlling read and write locations for data stored to the first memory and to the second memory
   an energy management system coupled to the second memory, the energy management system controlling a power state of the second memory,
   a data bus coupled to the first memory and the second memory;
   wherein a selected segment of the first memory acts as a circular buffer and real-time data received on the data bus is stored to the selected segment,
   a processor coupled to the address logic circuit, the energy management system, and the data bus, the processor monitoring data received on the data bus and identifying designated events having at least the first event and the second event, wherein the processor sends an event trigger to the address logic circuit and to the energy management system upon detection of a designated event including at least the first event, wherein the energy management system supplies power to the second memory upon detection of the first event trigger, and wherein the address logic circuit causes data to be stored to the second memory upon detection of the first event trigger without looping or overwriting the first memory of the first memory for the duration of a data-capture window of the first loop, wherein the processor is further configured to maintain a pointer to mark the beginning of second event data that overlaps within a data-capture window of the first event, wherein the first memory continues to record incoming data for the duration of the second event capture window with looping or overwriting the first memory, and wherein, after capturing the second event data in the data capture window, the second memory is powered on and the second even data is transferred to the outer memory.

2. The recording device of claim 1, further comprising:
the energy management system coupled to the first memory, the energy management system controlling a power state of segments of the first memory.

3. The recording device of claim 1, wherein the address logic circuit further comprises a pointer table identifying locations of stored data for a plurality of events.

4. The recording device of claim 1, wherein the first event data is transferred during the second event data capture window.

5. A method for storing data having a first event and a second event, wherein the second event occurs within a data capture window of the first event, comprising:
storing first pre-event data to a first segment of a first memory, the first segment operating as a circular buffer to store a selected duration of recent data;
receiving a first event trigger;
storing first post-event data received after the first event trigger beginning at a second segment of the first memory during a first data-capture period;
powering-on a second memory;
transferring the first pre-event data and first post-event data to a first segment of the second memory without looping or overwriting the first memory for the duration of a data-capture window of the first loop,
receiving a second event trigger during the first data-capture period;
storing a pointer to a location in the first memory corresponding to receipt of the second event trigger;
storing second post-event data to the first memory during a second data-capture period with looping or overwriting the first memory, wherein the second data-capture period overlaps the first data-capture period; and
transferring the second pre-event data and second post-event data to a second segment of the second memory after the looping or overwriting the first memory by the second event data.

6. The method of claim 5, wherein the second memory is powered-on at the end of the first data-capture period.

7. The method of claim 5, wherein the first pre-event data and first post-event data is transferred to the first segment of the second memory at the end of the first data-capture period.

8. The method of claim 5, wherein powering-on the second memory comprises:
powering-on only selected segments of the second memory.

9. The method of claim 5, wherein powering-on the second memory comprises:
powering-on all segments of the second memory.

10. The method of claim 5, further comprising:
storing a pointer to a location in the first memory corresponding to receipt of the second event trigger.

11. The method of claim 5, wherein the first event data is transferred during the second event data capture window.

12. A recording device that can detect a first event and a second event, wherein the second event occurs within a data capture window of the first event, comprising:
a first memory partitioned into a plurality of first segments, sizes of the first segments selected to provide storage for a predetermined pre-event time period, the first memory optimized relative to a second memory to require low access power;
the second memory partitioned into a plurality of second segments, sizes of the second segments selected to provide storage for a predetermined post-event time period, the second memory optimized relative to the first memory to require low static power; and
an address logic circuit coupled to the first memory and to the second memory, the address logic circuit controlling read and write locations for data stored to the first memory and to the second memory,
a data bus coupled to the first memory and the second memory;
wherein a selected segment of the first memory acts as a circular buffer and real-time data received on the data bus is stored to the selected segment,
an auto-address logic (AAL) coupled to the address logic circuit, the energy management system, and the data bus, the AAL monitoring data received on the data bus and identifying designated events having at least the first event and the second event,
wherein the AAL sends an event trigger to the address logic circuit and to the energy management system upon detection of a designated event including at least the first event,
wherein the energy management system supplies power to the second memory upon detection of the first event trigger, and
wherein the address logic circuit causes data to be stored to the second memory upon detection of the first event trigger without looping or overwriting the first memory of the first memory for the duration of a data-capture window of the first loop,
wherein the AAL is further configured to maintain a pointer to mark the beginning of second event data that overlaps within a data-capture window of the first event, wherein the first memory continues to record incoming data for the duration of the second event capture window,
wherein, after capturing the second event data in the data capture window, the second memory is powered on and the second even data is transferred to the outer memory.
transferring the second pre-event data and second post-event data to a second segment of the second memory after the looping or overwriting the first memory by the second event data.

13. The recording device of claim 12, further comprising:
an energy management system coupled to the second memory, the energy management system controlling a power state of the second memory.

14. The recording device of claim 13, further comprising:
the energy management system coupled to the first memory, the energy management system controlling a power state of segments of the first memory.

15. The recording device of claim 12, wherein the segments of the first memory act as circular buffers for storing real-time data.

16. The recording device of claim 12, wherein the address logic circuit further comprises a pointer table identifying locations of data stored for a plurality of events.

17. The recording device of claim 12, wherein the energy management system supplies power to the second memory upon detection of an event trigger, and wherein the address logic circuit causes data to be stored to the second memory upon detection of the event trigger.

18. The recording device of claim 12, wherein the first event data is transferred during the second event data capture window.

* * * * *